US012516629B2

(12) United States Patent
Hisgett et al.

(10) Patent No.: US 12,516,629 B2
(45) Date of Patent: Jan. 6, 2026

(54) ELECTRIC DRIVE APPARATUS

(71) Applicant: Rolls-Royce plc, London (GB)

(72) Inventors: Paul W Hisgett, Solihull (GB); Mark A Tanner, Birmingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/805,698

(22) Filed: Aug. 15, 2024

(65) Prior Publication Data

US 2025/0092828 A1  Mar. 20, 2025

(30) Foreign Application Priority Data

Sep. 14, 2023  (GB) ..................................... 2314033

(51) Int. Cl.
*F02C 7/22* (2006.01)
*F04D 13/06* (2006.01)
*H02P 27/06* (2006.01)

(52) U.S. Cl.
CPC ................ *F02C 7/22* (2013.01); *F04D 13/06* (2013.01); *H02P 27/06* (2013.01); *F05D 2240/35* (2013.01)

(58) Field of Classification Search
CPC .... F02C 7/22; F02C 9/30; F04D 13/06; H02P 27/06; H02P 6/08; F05D 2240/35
See application file for complete search history.

(56) References Cited

U.S. PATENT DOCUMENTS 6,208,109 B1  3/2001 Yamai et al.
8,141,360 B1 *  3/2012 Huber .................... F01K 23/065
                                                        290/40 B
(Continued)

FOREIGN PATENT DOCUMENTS

EP    1 470 988 A1   10/2004
EP    3 159 514 A1   4/2017
(Continued)

OTHER PUBLICATIONS

Yang et al., "Multiple Sine-Wave Superposition Drive for the Doubly Salient Motor Based on Fourier Linearization Modeling", IEEE Transactions on Power Electronics, vol. 34, No. 4, Apr. 2022.
(Continued)

*Primary Examiner* — Loren C Edwards
(74) *Attorney, Agent, or Firm* — Oliff PLC

(57) ABSTRACT

The present disclosure relates to an electric drive apparatus 201, 202 comprising an inverter system 220, an electric motor 230 and a controller 290. The electric motor 230 includes a rotor 234 and a plurality of phase windings 221, 222, 223, 224. The inverter system 220 is configured to provide a respective current waveform 321, 322, 323, 324 to each of the phase windings 221, 222, 223, 224 of the electric motor 230. Each current waveform 321, 322, 323, 324 is defined by a group of electrical characteristics including: a frequency composition, a phase shift relative to a reference waveform 349, and an amplitude. For one or more of the current waveforms 321, 322, 323, 324, the controller 290 is configured to control one or more of the group of electrical characteristics to cause a periodically varying torque to be applied to the rotor 234.

18 Claims, 10 Drawing Sheets

(56) References Cited

U.S. PATENT DOCUMENTS

| | | | |
|---|---|---|---|
| 2004/0206571 A1* | 10/2004 | Nishizaki | B62D 5/0472 |
| | | | 180/446 |
| 2010/0158670 A1 | 6/2010 | Fox | |
| 2013/0181687 A1 | 7/2013 | Smout | |
| 2015/0333670 A1* | 11/2015 | Nakajima | H02P 6/10 |
| | | | 318/400.2 |
| 2017/0207740 A1 | 7/2017 | Hargis | |
| 2021/0119558 A1 | 4/2021 | Matsunobu et al. | |

FOREIGN PATENT DOCUMENTS

| | | |
|---|---|---|
| EP | 4 166 773 A1 | 4/2023 |
| JP | 2006-042419 A | 2/2006 |

OTHER PUBLICATIONS

Mar. 14, 2024 Search Report issued in British Patent Application No. 2314033.8.

\* cited by examiner

ELECTRIC DRIVE APPARATUS

This specification is based upon and claims the benefit of priority from UK Patent Application Number 2314033.8 filed on 14 Sep. 2023, the entire contents of which are incorporated herein by reference.

BACKGROUND

Technical Field

The present disclosure concerns an electric drive apparatus comprising an inverter system, an electric motor and a controller, with the controller being configured to control the inverter system.

Background of the Disclosure

It is known to drive a fuel pump for a gas turbine engine from an accessory gearbox which is coupled to a spool of the gas turbine engine, with the fuel pump driving a flow of fuel to a combustor of the gas turbine engine. In use, a rotational speed at which the fuel pump is driven therefore matches a rotational speed of an output of the accessory gearbox, which it is in turn determined by a rotational speed of the spool. While there may be pressure variations and/or flow-rate variations (which may be described as a flow ripple) in the flow of fuel which arise as a result of the characteristics of the fuel pump are therefore linked to the rotational speed of the spool, and so adequate control of the flow ripple in the flow of fuel may be difficult to achieve. It is desirable to provide improved means for driving a load, such as a fuel pump for a gas turbine engine, which enable these challenges to be overcome.

EP 3159514 A1 discloses an aero-engine low pressure pump for supplying fuel at a raised pressure to a high-pressure pump. The low-pressure pump has a pumping mechanism which raises the pressure of fuel flowing though the mechanism. The low-pressure pump further has an electrical motor which drives the pumping mechanism. The low-pressure pump further has a variable frequency motor drive which supplies electrical power to the electrical motor. The variable frequency motor drive measures the electrical power supplied to the electrical motor. The low-pressure pump further has a control unit which compares the measured electrical power to a reference power, and, when the measured electrical power is less than the reference power by a predetermined amount, controls the motor drive to increase the power supplied to the electrical motor thereby increasing the pressure rise produced by the pumping mechanism.

US 2013/0181687 A1 discloses a fault-tolerant electric drive system comprising an alternator, a motor controller and an electric motor. The alternator and motor each have a plurality of corresponding independent phase windings. The motor controller has a plurality of independent phase drives corresponding to the phase windings. A plurality of independent electric drive phases are defined by connecting each corresponding phase winding of the alternator and motor to a corresponding phase drive of the motor controller.

SUMMARY

According to a first aspect of the present disclosure, there is provided an electric drive apparatus comprising an inverter system, an electric motor and a controller, wherein the electric motor includes a rotor and a plurality of phase windings; the inverter system is configured to provide a respective current waveform to each of the phase windings of the electric motor; each current waveform is defined by a group of electrical characteristics including: a frequency composition, a phase shift relative to a reference waveform, the reference waveform relating to an angular position of the rotor and/or an angular position of a magnetic field induced in the phase windings when each current waveform is provided to the respective phase winding, and an amplitude; and for one or more of the current waveforms, the controller is configured to control one or more of the group of electrical characteristics to cause a periodically varying torque to be applied to the rotor.

It may be that the inverter system comprises a plurality of inverters. The phase windings may be independent phase windings. It may also be that each inverter is configured to provide one of the respective current waveforms to the phase windings of the electric motor. For each current waveform, the electrical characteristic frequency composition may include one or more frequency components.

The periodically varying torque may be defined by torque characteristics including: a frequency composition, a phase shift relative to the reference waveform, and an amplitude. The controller may be configured to control one or more of the electrical characteristics of the or each current waveform to control one or more of the torque characteristics. The torque frequency composition may include one or more frequency components.

The reference waveform may relate to the angular position of the rotor relative to one of the phase windings. The reference waveform may relate to an estimated angular position of the rotor relative to the one of the phase windings. The angular position may be estimated based on a uniform rotational speed of the rotor. The reference waveform may relate to a monitored angular position of the rotor relative to the one of the phase windings. The reference waveform may relate to a back-electromotive force signal at the one of the phase windings, corresponding to rotation of the rotor.

The controller may be configured so that for the or each electrical characteristic which is controlled to cause the periodically varying torque, the controller causes the electrical characteristic to vary between at least two of the current waveforms.

The controller may be configured to: control the phase shift of the periodically varying torque by controlling the phase shift of one or more of the current waveforms so that the phase shift varies between at least two of the current waveforms.

The controller may be configured to: control the amplitude of the periodically varying torque by: controlling the phase shift of one or more of the current waveforms so that the phase shift varies between at least two of the current waveforms; and/or controlling the amplitude of one or more of the current waveforms so that the amplitude varies between at least two of the current waveforms.

The controller may be configured to: control the frequency composition of the periodically varying torque by controlling the frequency composition of one or more of the current waveforms so that the frequency composition includes one or more frequency components which are not equal to a fundamental frequency of the reference waveform.

The controller may be configured to control the or each torque characteristic to be maintained at a respective target value. The or each target value may be defined according to an angular speed of the rotor. Otherwise, it may be that the or each target value is a predetermined target value which is permanently stored on a memory provided to the controller and which is not altered or updated during operation of the electric drive apparatus. It may be that the predetermined target value is permanently stored on the read-only memory provided to the controller during a manufacturing commissioning, or servicing process of the electric drive apparatus.

For each torque characteristic to be maintained at a respective target value, the respective target value may be stored on a memory provided to the controller. The controller may be configured to update the target value to vary operation of the electric drive apparatus. The controller may be configured to receive an updated target value for one or more of the torque characteristics from an external system.

The electric drive apparatus may comprise a sensing arrangement. The rotor may be configured to drive a load. The sensing arrangement may be configured to monitor a parameter associated with the load. The controller may be configured to update the or each target value based on the monitored parameter to cause or vary a periodic variation of the monitored parameter.

The monitored parameter may be selected from a group consisting of: a displacement, a velocity, an acceleration, a strain and a stress associated with the load; the monitored parameter relates to a vibration of the load. The monitored parameter may be selected from a group consisting of: a pressure, a flow rate, a density, a velocity and a viscosity of a fluid flow driven by the load. The monitored parameter may be an acoustic parameter relating to a fluid flow driven by the load.

The monitored parameter may be one or more parameters of a respective group, and the controller may be configured to update the target value based on the one or more monitored parameters to cause or vary a periodic variation in the monitored parameter.

The load may be a pump for driving a fluid flow. The monitored parameter may be selected from a group consisting of: a pressure, a flow-rate, a density, a velocity and a viscosity of the fluid, or an acoustic parameter relating to the fluid flow driven by the pump.

The pump may be a fuel pump for pumping fuel to a combustor, for example a combustor of a gas turbine engine. The electric drive apparatus may comprise a fluid passageway configured to convey the fluid from the pump. The sensor may be configured to monitor the parameter associated with the fluid at a monitoring location downstream of the pump within the fluid passageway. The controller may be configured to update the target value based on the monitored parameter so as to control a ripple waveform in the fluid flow. The controller may be configured to update the target value based on the monitored parameter so as to control a ripple waveform in the fluid flow to maintain a target flow ripple amplitude, a target flow ripple frequency composition and/or a target flow phase shift of the ripple waveform.

According to a second aspect of the present disclosure, there is provided a fuel supply apparatus comprising an electric drive apparatus in accordance with the first aspect and a fluid passageway, wherein the fluid is a fuel; the fluid passageway is configured to convey the fuel from the pump to a combustor, for example a combustor of a gas turbine engine; the controller is configured to update the target value based on the monitored parameter so as to control a ripple waveform in the fuel flow to maintain: a combustor rumble parameter within a target rumble range; and/or a target flow ripple amplitude, a target flow ripple frequency composition and/or a target flow phase shift of the ripple waveform relative to a control regime for a fuel valve within a respective target range for operation of the fuel valve, wherein the fuel valve is configured to control fuel flow from the fluid passageway to the combustor.

According to a third aspect of the present disclosure, there is provided a gas turbine engine comprising an electric drive apparatus in accordance with the first aspect and/or a fuel supply apparatus in accordance with the second aspect.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
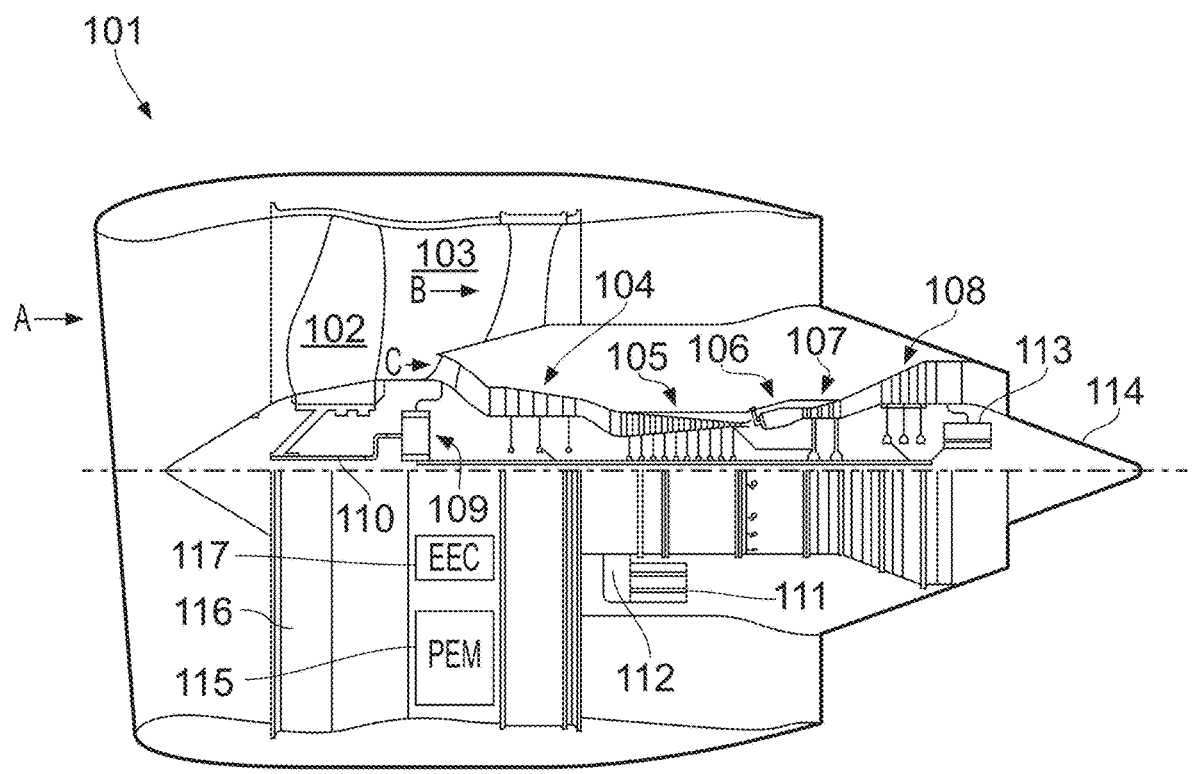
FIG. 1 shows a general arrangement of a turbofan engine for an aircraft.

A general arrangement of an engine 101 for an aircraft is shown in FIG. 1. The engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art. Those skilled in the art will also appreciate that whilst the illustrated engine has two spools, other gas turbine engines have a different number of spools, e.g., three spools.

The fan 102 is driven by the low-pressure turbine 108 via a reduction gearbox in the form of a planetary-configuration epicyclic gearbox 109. Thus, in this configuration, the low-pressure turbine 108 is connected with a sun gear of the gearbox 109. The sun gear is meshed with a plurality of planet gears located in a rotating carrier, which planet gears are in turn meshed with a static ring gear. The rotating carrier drives the fan 102 via a fan shaft 110. It will be appreciated that in alternative embodiments a star-configuration epicyclic gearbox (in which the planet carrier is static, and the ring gear rotates and provides the output) may be used instead, and indeed that the gearbox 109 may be omitted entirely so that the fan 102 is driven directly by the low-pressure turbine 108.

It is increasingly desirable to facilitate a greater degree of electrical functionality on the airframe and on the engine. To this end, the engine 101 of the present embodiment comprises one or more rotary electric machines, generally capable of operating both as a motor and as a generator. The number and arrangement of the rotary electric machines will depend to some extent on the desired functionality. Some embodiments of the engine 101 include a single rotary electric machine 111 driven by the high-pressure spool, for example by a core-mounted accessory drive 112 of conventional configuration. Such a configuration facilitates the generation of electrical power for the engine and the aircraft and the driving of the high-pressure spool to facilitate starting of the engine in place of an air turbine starter. Other embodiments, including the one shown in FIG. 1, comprise both a first rotary electric machine 111 coupled with the high-pressure spool and a second rotary electric machine 113 coupled with the low-pressure spool. In addition to generating electrical power and the starting the engine 101, having both first and second rotary machines 111, 113, connected by power electronics, can facilitate the transfer of mechanical power between the high and lower pressure spools to improve operability, fuel consumption etc.

As mentioned above, in FIG. 1 the first rotary electric machine 111 is driven by the high-pressure spool by a core-mounted accessory drive 112 of conventional configuration. In alternative embodiments, the first electric machine 111 may be mounted coaxially with the turbomachinery in the engine 101. For example, the first electric machine 111 may be mounted axially in line with the duct between the low- and high-pressure compressors 104 and 105. In FIG. 1, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113. It will of course be appreciated by those skilled in the art that any other suitable location for the first and (if present) second electric machines may be adopted.

The first and second electric machines 111, 113 are connected with power electronics. Extraction of power from or application of power to the electric machines is performed by a power electronics module (PEM) 115. In the present embodiment, the PEM 115 is mounted on the fan case 116 of the engine 101, but it will be appreciated that it may be mounted elsewhere such as on the core of the gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e., both of the core gas turbine and the first and second electric machines 111 and 113. In this way, the EEC 117 may holistically respond to both thrust demand and electrical power demand.

The one or more rotary electric machines 111, 113 and the power electronics 115 may be configured to output to or receive electric power from one, two or more dc busses. The dc busses allow for the distribution of electrical power to other engine electrical loads and to electrical loads on the airframe. The dc busses may further receive electrical power from, or deliver electrical power to, an energy storage system such as one or more battery modules or packs.

Those skilled in the art will appreciate that the gas turbine engine 101 described above may be regarded as a 'more electric' gas turbine engine because of the increased role of the electric machines 111, 113 compared with those of conventional gas turbines.

Figure 2:
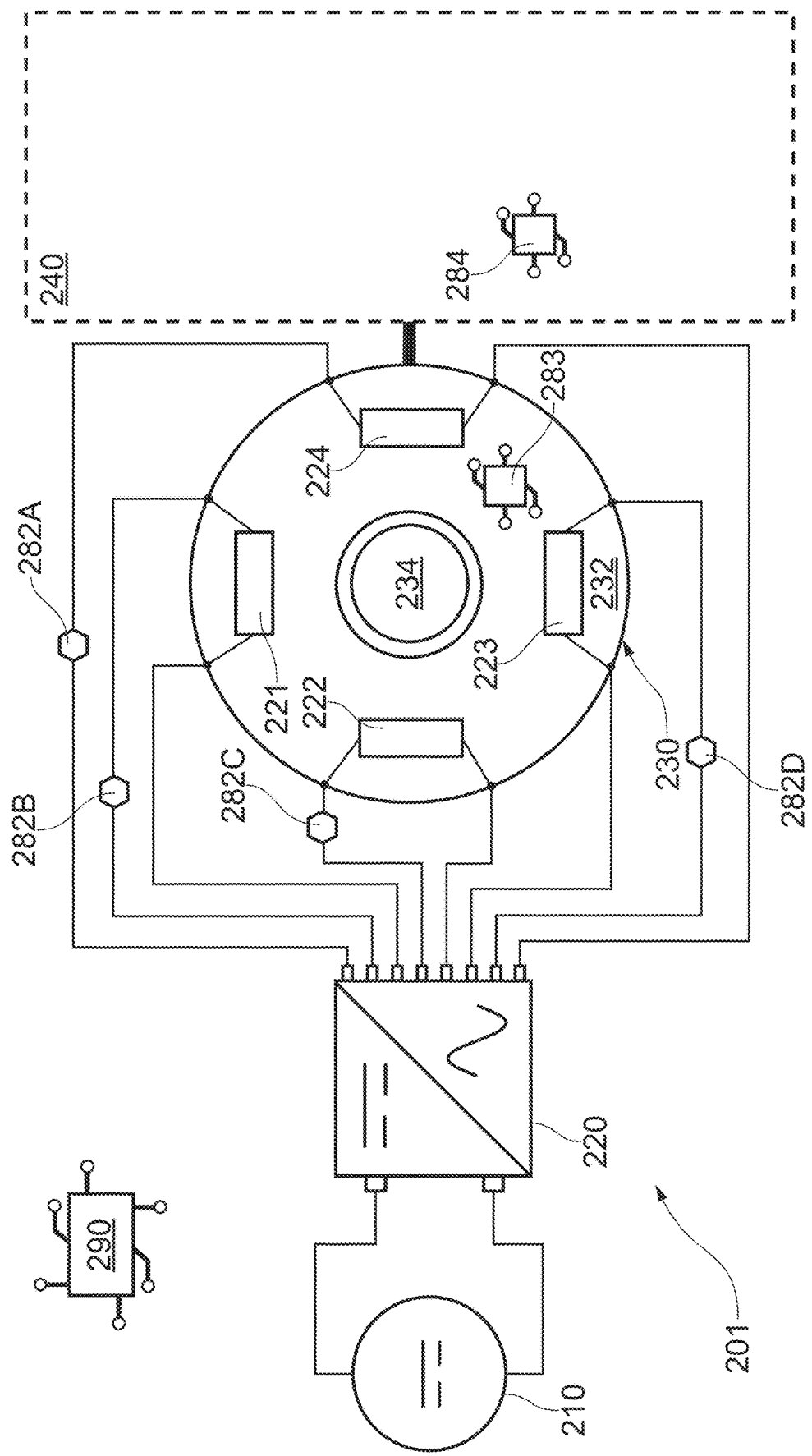
FIG. 2 is a schematic diagram of a first example electric drive apparatus.
Figure 3:
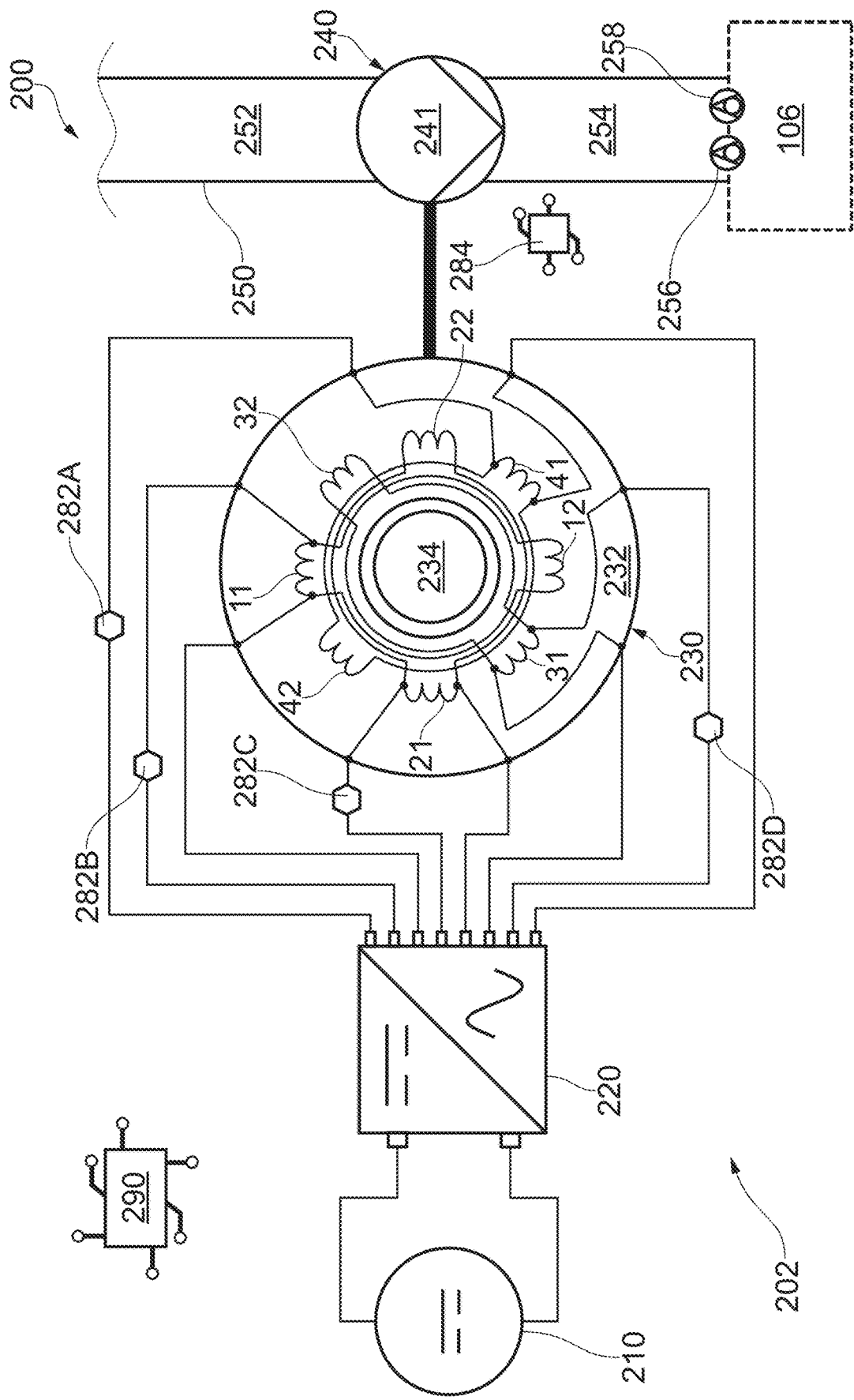
FIG. 3 is a schematic diagram of a second example electric drive apparatus.

FIGS. 2 and 3 are schematic diagrams of respective example electric drive apparatuses 201, 202 which are particularly, but not exclusively, suitable for use with the gas turbine engine 101 of FIG. 1. Each example electric drive apparatus 201, 202 comprises an inverter system 220, an electric motor 230 (e.g., an AC electric motor 230), a plurality of current sensors 282A-282D, a rotor sensing arrangement 283, a load-associated sensing arrangement 284 and a controller 290. If used with the gas turbine engine 101 of FIG. 1, the electric motor 230 may function as the first rotary electric machine 111 or the second rotary electric machine 113.

The electric motor 230 includes a rotor 234, a stator 232 and a plurality of independent phase windings 221-224. In the example of FIG. 2, the plurality of phase windings comprises a first phase winding 221, a second phase winding 222, a third phase winding 223, and a fourth phase winding 224. Consequently, the electric motor 230 shown by FIGS. 2-3 may be described as a four-phase electric motor 230. Also, in the example of FIGS. 2-3, each of the plurality of phase windings 221-224 is associated with (e.g., disposed on or within) the stator 232. Nevertheless, it will be appreciated that in other examples in accordance with the present disclosure, the plurality of phase windings may be comprised of any suitable number of phase windings and/or each of the plurality of phase windings may be associated with (e.g., disposed on or within) the rotor 234. Each phase winding 221-224 may comprise one or more coils.

In the example of FIG. 3, the first phase winding 221 comprises a first pair of coils 11, 12 diametrically opposed to one another with respect to the rotor 234. Likewise, the second phase winding 222 comprises a second pair of coils 21, 22 diametrically opposed to one another, the third phase winding 223 comprises a third pair of coils 31, 32 diametrically opposed to one another and fourth phase winding 224 comprises a fourth pair of coils 41, 42 diametrically opposed to one another. The first to fourth pairs of coils are sequentially angularly offset at 45° intervals around the rotor 234.

The rotor 234 is mechanically coupled to a load 240 and is therefore configured to drive the load 240. The load-associated sensing arrangement 284 is configured to monitor at least one parameter associated with the load 240. The load 240 is directly or indirectly driven by rotation of the rotor 234. By way of example, the load 240 may be directly mechanically coupled to the load 240 via a driveshaft. By way of further example, the load 240 may be indirectly coupled to the load 240 via a transmission comprising a gearbox.

In the first example electric drive apparatus 201 of FIG. 2, the load 240 is a turbomachine disc (e.g., a turbine disc or a compressor disc which is connected to and/or forms a part of a spool of the gas turbine engine 101 of FIG. 1). Hence, in the first example electric drive apparatus 201, the parameter monitored by the load-associated sensing arrangement 284 may include one or more of: a displacement, a velocity, an acceleration, a strain and a stress associated with the turbomachine disc and/or the parameter monitored by the load-associated sensing arrangement 284 may relate to a vibration of the turbomachine disc.

Contrastingly, in the second example electric drive apparatus 202 of FIG. 3, the load 240 is a pump 241 which is configured to drive a fluid flow (i.e., to move fluid) along a fluid passageway 250. As a result, in the second example electric drive apparatus 202, the parameter monitored by the load-associated sensing arrangement 284 may include one or more of: a displacement, a velocity, an acceleration, a strain and a stress associated with a body of the pump 241 (e.g., a moving part of the pump 241) and/or the parameter monitored by the load-associated sensing arrangement 284 may relate to a vibration of the body of the pump 241. In addition, or instead, in the second example electric drive apparatus 202, the parameter monitored by the load-associated sensing arrangement 284 may include one or more of: a pressure, a flow rate, a density, a velocity and a viscosity of the fluid flow driven by the load 240 and/or the parameter monitored by the load-associated sensing arrangement 284 may be an acoustic parameter relating to the fluid flow driven by the load 240. In use, it may be that operation of the pump 241 to drive the fluid flow along the fluid passageway 250 results in temporal variations in the pressure, the flow rate, the density, the velocity and/or the viscosity of the fluid flow downstream of the pump 241. Such temporal variations in these properties may be described as being or relating to a flow ripple waveform in the fluid conveyed by the fuel passageway 250.

The second example electric drive apparatus 202 of FIG. 3 forms a part of a fuel supply apparatus 200. The fuel supply apparatus 200 is particularly, but not exclusively, suitable for use with the gas turbine engine 101 of FIG. 1. A first portion 252 of the fluid passageway 250 is configured to receive fuel from a master fuel supply system (not shown) or a fuel storage device such as a fuel tank (not shown) and to convey fuel to the pump 241. The pump 241 is configured to drive a fuel flow (i.e., to move fuel) along the fluid passageway 250 toward a combustor 106 (e.g., of the gas turbine engine 101 of FIG. 1). A second portion 254 of the fluid passageway 250 is configured to convey fuel from the pump 241 to the combustor 106. A plurality of fuel valves 256, 258 are provided in communication with the second portion 254 of the fluid passageway 250. Each of the plurality of fuel valves 256, 258 are configured to control fuel flow from the fluid passageway 250 into the combustor 106 (e.g., to control fuel discharge from the fuel passageway 250 into the combustor 106). Each fuel valve 256, 258 may be a poppet valve having a valve face and corresponding valve seat, with the valve face being mechanically biased toward the valve seat by, for instance, a spring. The load-associated sensing arrangement 284 may be located with respect to the pump 241 so as to monitor the parameter at a location downstream of the pump 241 within the second portion 254 of the fluid passageway 250.

The inverter system 220 is generally configured to receive an input DC current from a power source 210 and to provide a plurality of output AC currents to the plurality of phase windings 221-224. More specifically, the inverter system 220 is configured to provide a respective current waveform to each of the phase windings 221-224 of the electric motor 230. In the examples of FIGS. 2 and 3, the inverter system 220 is shown as being a single unitary inverter system 220 having a pair of input terminals electrically coupled to the power source 210 and a plurality of output terminals, with each output terminal being coupled to a respective phase winding 221-224 of the electric motor 230. Despite this, it should be appreciated that the inverter system 220 may be formed of a plurality of inverters, with each inverter being configured to provide one of the respective current waveforms to the phase windings 221-224 of the electric motor 230. Each inverter may be configured to receive an input DC current from the power source 210. To this end, input terminal pairs of the plurality of inverters may be electrically connected in parallel with respect to each other input terminal pair and with respect to the power source 210. The inverter system 220 may comprise a plurality of switching devices, at least one inductive element and/or at least one capacitive element arranged in a suitable inverter system topology, as will be known to those skilled in the art.

The controller 290 is generally configured to control operation of the inverter system 220. More specifically, the controller 290 is configured to control one or more of a group of electrical characteristics which define the current waveform provided to each of the plurality of phase windings 221-224 by controlling operation of the inverter system 220. The group of electrical characteristics which define each current waveform includes a frequency composition, a phase shift and an amplitude, as described in further detail below. To control the frequency composition, the phase shift and/or the amplitude of the current waveform, the controller 290 may vary a switching timing, a switching frequency and/or a duty cycle of one or more of the switching devices of the inverter system 220. The switching timing, the switching frequency and the duty cycle of the one or more switching devices may be varied by varying a timing, a frequency and a duty cycle, respectively, of a pulse-width modulation (PWM) signal provided to the corresponding switching device.

The frequency composition of the current waveform determines a shape of the current waveform. As an example, if a current waveform is a simple sinusoid, the frequency composition may include only a single frequency component which is equal to a fundamental frequency of the current waveform, $f_{c,1}{}''$. As another example, if a current waveform is a square wave, the frequency composition may include a plurality (e.g., a large number) of frequency components, $f_{c,i}{}''$, at integer multiples of the fundamental frequency of the current waveform, $f_{c,1}{}^n$, as will be understood by those of ordinary skill in the art. In the notation used here, subscript c indicates that the frequency component relates to a current, subscript i denotes the harmonic of the frequency component, and superscript n denotes which current waveform the frequency component is associated with.

The phase shift of the current waveform is defined as being a phase angle difference between the current waveform and a reference waveform (or a baseline waveform). If the electric motor 230 is an asynchronous AC motor 230 or a synchronous AC motor 230, the reference waveform relates to an angular position of a magnetic field induced in the phase windings 221-224. Otherwise, if the electric motor 230 is a synchronous AC motor 230, the reference waveform may relate to an angular position of the rotor 234 relative to one of the phase windings 221-224, which may be referred to as a reference phase winding, or an angular position of the rotor 234 relative to a reference point on the stator 232.

If the electric motor 230 is an asynchronous AC motor 230, the reference waveform may relate to an estimated angular position of the magnetic field induced in the phase windings 221-224, with the angular position of the magnetic field induced in the phase windings 221-224 being estimated based on a uniform rotational speed of the rotor 234 (i.e., the synchronous speed of the motor 230) and optionally a slip (if the motor 230 is an asynchronous motor). In turn, the uniform rotational speed of the rotor 234 may be a notional uniform rotational speed which is determined or received by the controller 290 based on a determined or received speed demand for the rotor 234. The slip may be a notional/estimated slip which is determined or received by the controller based on a determined or received torque demand for the rotor 234 (if the motor 230 is an asynchronous motor) or a monitored slip. In addition, or instead, the uniform rotational speed of the rotor 234 may be a monitored uniform rotational speed which is determined based on a rotor speed signal received from a rotational speed sensor (e.g., a Hall-effect sensor) adapted to monitor the rotational speed of the rotor 234. Otherwise, the reference waveform may relate to a directly monitored angular position of the magnetic field induced in the phase windings 221-224, with the angular position of the magnetic field induced in the phase windings 221-224 being monitored using appropriate transducers. Otherwise, the angular position of the magnetic field induced in the phase windings 221-224 may be determined (e.g. estimated, inferred) based on the angular position of the rotor 234 and optionally the slip.

If the electric motor 230 is a synchronous AC motor 230, the reference waveform may relate to an estimated angular position of the rotor 234 relative to the reference phase winding, with the angular position of the rotor 234 relative to the reference phase winding being estimated based on a uniform rotational speed of the rotor 234. In turn, the uniform rotational speed of the rotor 234 may be a notional uniform rotational speed which is determined or received by the controller 290 based on an expected rotational speed for the rotor 234 under current operating conditions. Additionally, or alternatively, the uniform rotational speed of the rotor 234 may be a monitored uniform rotational speed which is determined based on a rotor speed signal received from a rotational speed sensor (e.g., a Hall-effect sensor) adapted to monitor the rotational speed of the rotor 234. The rotor sensing arrangement 283 may comprise such a rotational speed sensor. By way of further example, the reference waveform may relate to a monitored angular position of the rotor 234 relative to the reference phase winding, with the angular position of the rotor 234 relative to the reference phase winding being determined based on a rotor position signal received from an angular position sensor (e.g., an encoder) adapted to monitor the angular position of the rotor 234. The rotor sensing arrangement 283 may comprise such an angular position sensor. By way of yet further example, the reference waveform may relate to a back-electromotive force (back-emf) signal at one of the phase windings 221-224. Those skilled in the art will understand that the back-emf signal corresponds to rotation of the rotor 234 relative to the one of the phase windings 221-224.

The amplitude of the current waveform corresponds to a peak-to-peak current of the output AC current provided to the respective phase winding 221-224. In other words, the amplitude of the current waveform relates to an overall change in the output AC current provided to the respective phase winding 221-224 over the course of a single period of the corresponding output AC current.

For the purpose of the following description, the current waveform provided to the first phase winding 221 is referred to as the first current waveform, the current waveform provided to the second phase winding 222 is referred to as the second current waveform, the current waveform provided to the third phase winding 223 is referred to as the third current waveform, and the current waveform provided to the fourth phase winding 224 is referred to as the fourth current waveform.

Figure 4:
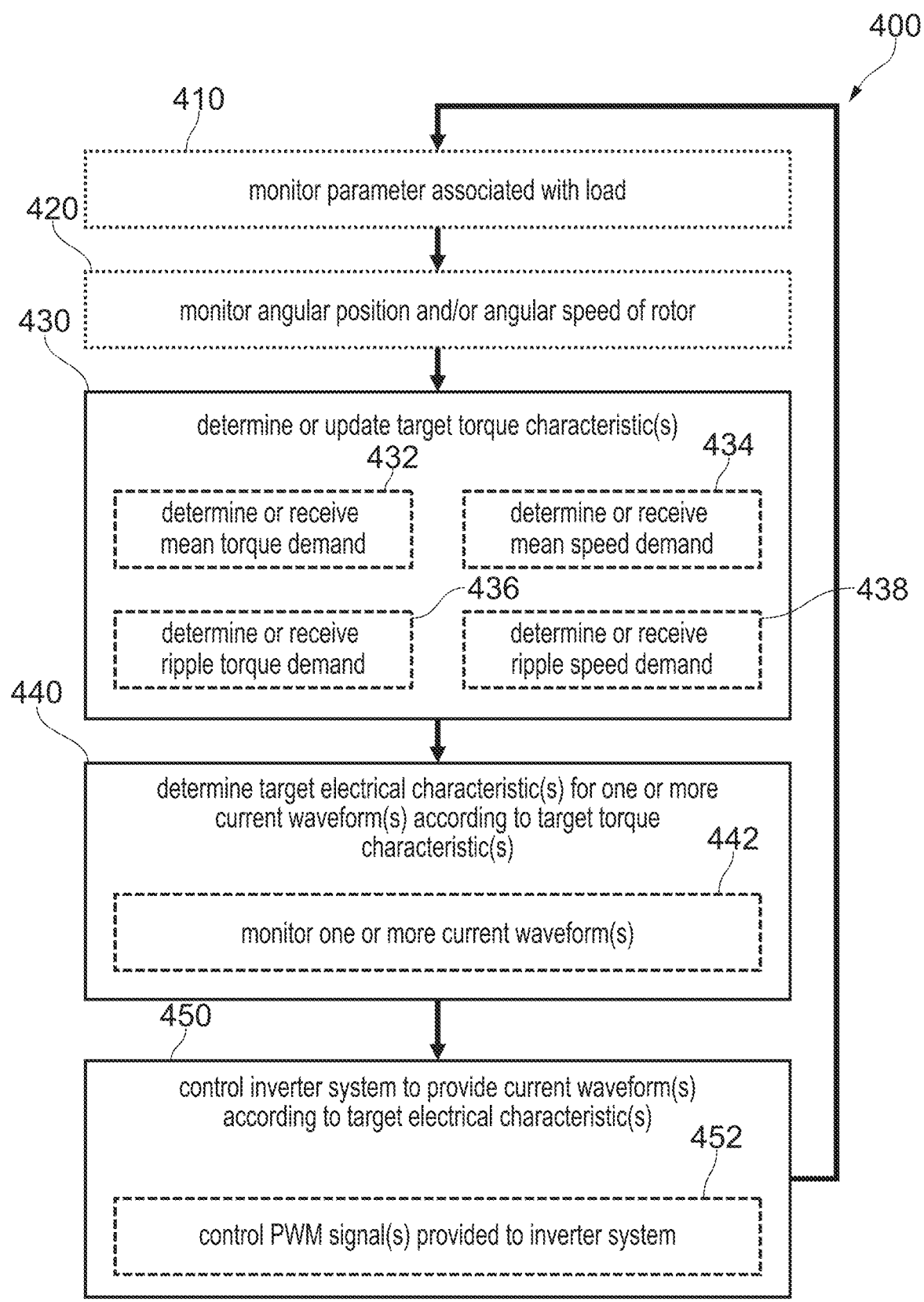
FIG. 4 is a flowchart which shows an example method of operating an electric drive apparatus.
Figure 5:
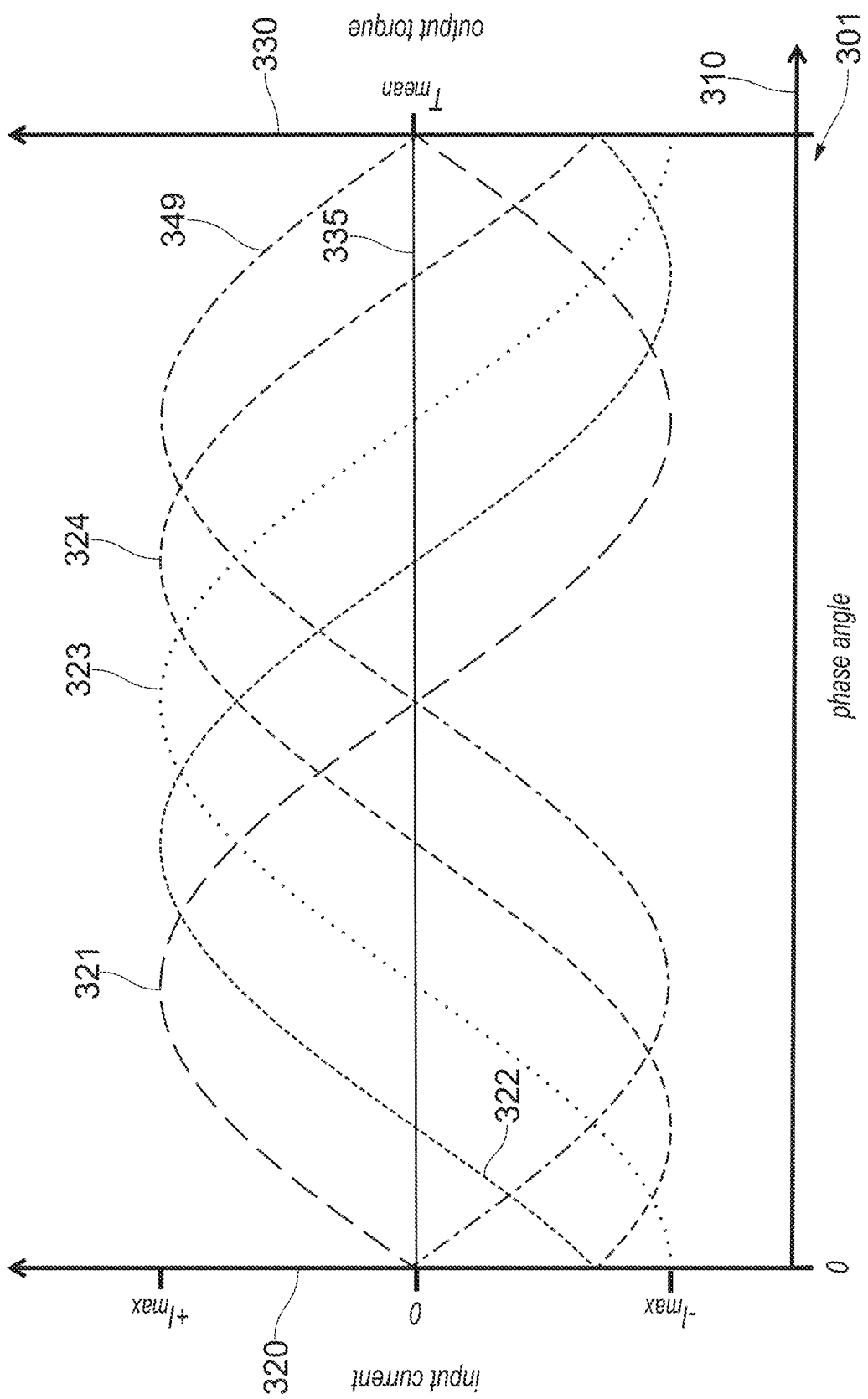
FIG. 5 is a first example annotated graph which shows a plurality of current waveforms and a temporally varying torque.
Figure 6:
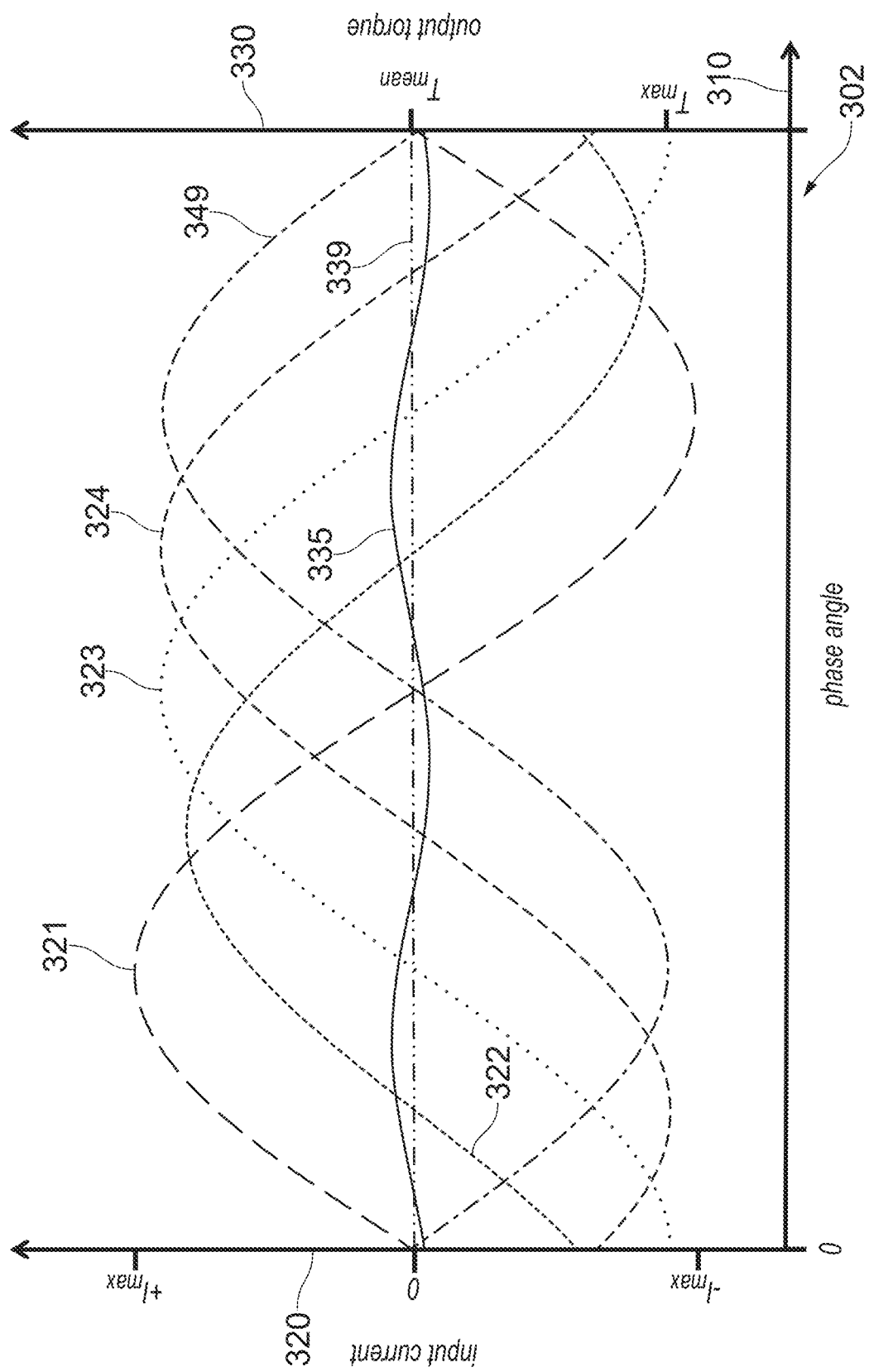
FIG. 6 is a second example annotated graph which shows a plurality of current waveforms and a temporally varying torque.
Figure 7:
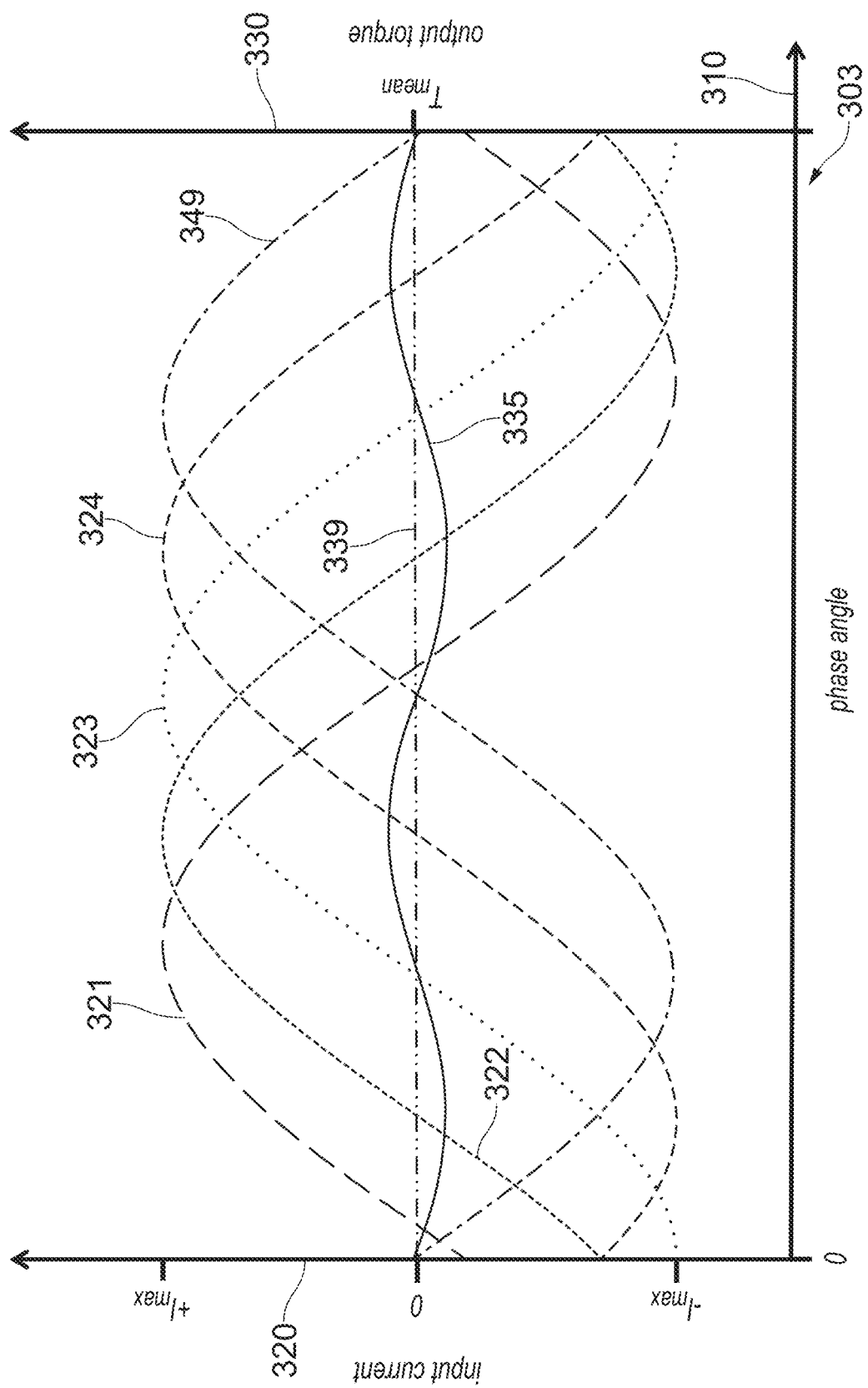
FIG. 7 is a third example annotated graph which shows a plurality of current waveforms and a temporally varying torque.

FIG. 4 is a flowchart which shows an example method 400 of controlling an electric drive apparatus in accordance with the present disclosure, such as the example electric drive apparatuses 201, 202 of FIG. 2 and of FIG. 3. The controller 290 of the example electric drive apparatuses 201, 202 of FIG. 2 and FIG. 3 may be generally configured to carry out the example method 400 shown by FIG. 4.

Some steps (blocks) of the method 400 shown in FIG. 4 may be considered optional (e.g. determinations of parameters based on monitoring), and are introduced out of sequence in the following description to describe particular optional implementations of the method 400.

The method 400 includes at least an action of determining or accessing (at block 430) one or more target torque characteristics, an action of determining (at block 440) one or more target electrical characteristics for one or more (e.g., each) current waveform(s) according to the one or more target torque characteristics, and an action of controlling (at block 450) the inverter system 220 to provide each respective current waveform to the respective phase winding 221-224 according to the determined one or more target electrical characteristics. Each of these actions are explained in further detail below.

The method 400 may also include an action of monitoring (at block 410) a parameter associated with the load 240 using the load-associated sensing arrangement 284 and/or an action of monitoring (at block 420) an angular position and/or an angular speed of the rotor 234 using the rotor sensing arrangement 283 as described above. The action represented by block 410 may include monitoring a plurality of parameters associated with the load 240 using the load-associated sensing arrangement 284, with each parameter being as described above with respect to FIGS. 2 and 3. In other words, the monitored parameter may be one or more parameters associated with the load 240.

The action of determining (at block 440) the target electrical characteristics for the or each current waveform according to the target torque characteristics (as determined or accessed at block 430) includes determining the electrical characteristics of each current waveform which to result in the torque applied to the rotor 234 having the determined target torque characteristics. To this end, the action of determining (at block 440) the target electrical characteristics for each current waveform includes an action of monitoring (at block 442) each current waveform using the plurality of current sensors 282A-282D. Each monitored current waveform may then be processed using, for example, a Park transformation and/or a Clarke transformation to enable the target electrical characteristics for each current waveform to be computed based on the target torque characteristics.

The action of controlling (at block 450) the inverter system 220 to provide each current waveform to the respective phase winding 221-224 according to the determined one or more target electrical characteristics includes controlling (e.g., varying) one or more of the electrical characteristics of the current waveforms provided to each phase winding 221-224 to maintain one or more of the group of torque characteristics within a target range for the torque characteristic (the target range may correspond to a tolerance range around a target torque characteristic). The action of controlling (at block 450) the inverter system 220 to provide each current waveform to the respective phase winding 221-224 according to the determined one or more target electrical characteristics may include an action of controlling (at block 452) the PWM signals provided to the inverter system 220 to maintain one or more of the group of torque characteristics within the target range for the torque characteristic using an appropriate PWM signal generation algorithm.

A more detailed explanation of the steps referenced above is now given with reference to FIGS. 5 to 10, which are respective example graphs 301, 302, 303, 304, 305, 306 showing examples of each of the first current waveform 321 (short-dashed line), the second current waveform 322 (medium-dashed line), the third current waveform 323 (dotted line) and the fourth current waveform 324 (long-dashed line) over a single electrical period as well as an example torque applied to the rotor 234 during the same period. The electrical period is equal to the period of the reference waveform. The torque applied to the rotor 234 during the period is represented by a torque profile 335 (solid line). Also shown on each of FIGS. 5 to 10 is an example reference waveform 349 (dash dotted line) across the same electrical period. Further, on each of FIGS. 6 to 10, a mean torque line 339 is also shown (double-dash dotted line). An x-axis 310 corresponds to a phase angle within the electrical period, a first y-axis 320 corresponds to the current supplied to the respective phase winding 221-224 for each current waveform 321-324 and a second y-axis 330 corresponds to the torque applied to the rotor 234. It will be understood that each of the current waveforms 321-324, the torque profile 335 and the reference waveform 349 are intended for illustrative and explanatory purposes only.

In the first example graph 301, the phase shift of the first current waveform 321 with respect to the reference waveform is approximately 180°, the phase shift of the second current waveform 322 with respect to the reference waveform is approximately 135°, the phase shift of the third current waveform 323 with respect to the reference waveform is approximately 90° and the phase shift of the fourth current waveform 324 with respect to the reference waveform is approximately 45°. It follows that the phase difference between each of the first to third current waveforms is 45°, while the phase difference between the fourth current waveform 324 and the first current waveform 321 is approximately 135° (or 225°). These particular phase differences between the current waveforms 321-324 were chosen so as to correspond to the angular offset(s) of the respective phase windings 221-224 (that is, the respect pairs of coils 11-42) used in the second example electric drive apparatus 202 described above with respect to FIG. 3. However, other phase differences may be chosen, for example according to the specific configuration of the electric drive apparatus.

Also, in the first example graph 301, the amplitude of each of the current waveforms 321-324 is substantially equal to the amplitude of the other current waveforms 321-324. Further, each current waveform 321-324 is a simple sinusoid and the frequency composition of each of the current waveforms 321-324 includes only a single frequency component which is equal to a fundamental frequency of the reference waveform 349, $f_{c,1}^{ref}$. As a result, the torque profile 335 does not substantially vary with respect to time throughout the electrical period. As will be appreciated by those skilled in the art, the mean torque applied to the rotor 234 is a function of the amplitude of the current waveforms 321-324, and the mean torque profile 335 may be controlled by varying the amplitude of each of the current waveforms 321-324. The angular speed at which the rotor 234 is driven to rotate is a function of the fundamental frequency of the reference waveform 349, $f_{c,1}^{ref}$, and the angular speed of the rotor 234 may be controlled by varying the fundamental frequency of the reference waveform 349, $f_{c,1}^{ref}$. In the notation used here, superscript ref indicates that the frequency component relates to the reference waveform.

In each of the second example graph 302 to the sixth example graph 306, the torque profile 335 is caused to periodically vary as a result of at least one of the group of electrical characteristics being controlled by the controller 290 in the manner(s) described below. A profile of the periodically varying torque profile 335 (e.g. a torque waveform 335) is defined by a group of torque characteristics including a mean torque, a frequency composition, a phase shift relative to the reference waveform 349, and an amplitude. In summary, one or more of the electrical characteristics of the or each current waveform 321-324 may be controlled (e.g., varied) to control (e.g., vary) one or more of the group of torque characteristics. The frequency composition, the phase shift relative to the reference waveform 349, and the amplitude of the periodically varying torque applied to the rotor 234 may be referred to as a group of torque ripple characteristics.

In the second example graph 302, the amplitude of the third current waveform 323 is substantially equal to the amplitude of the fourth current waveform 324. However, the amplitude of the first current waveform 321 is greater than the amplitudes of the third current waveform 323 and the fourth current waveform 324 while the amplitude of the second current waveform 322 is less than the amplitudes of the third current waveform 323 and the fourth current waveform 324. Resultingly, the torque profile 335 is caused to periodically vary. More specifically, the torque applied to the rotor 234 (i.e. the torque profile 335) is caused to periodically vary. The frequency composition of the varying torque profile 335 includes a first frequency component, $f_{t,i=1}$, which is approximately two times the fundamental frequency, $f_{c,1}^{ref}$, of the reference waveform 349. In the notation used here, subscript t indicates that the frequency component relates to a torque, and subscript i denotes a reference number of the frequency component.

Generally, the or each difference between amplitudes of the current waveforms is associated with the amplitude of the periodically varying torque profile 335. In the second example graph 302, the amplitude of the first current waveform 321 is approximately 10% greater than the amplitudes of the third current waveform 323 and the fourth current waveform 324 while the amplitude of the second current waveform 322 is appropriately 10% less than the amplitudes of the third current waveform 323 and the fourth current waveform 324. However, if the difference between the amplitude of the first current waveform 321 and the amplitudes of the third current waveform 323 and the fourth current waveform 324 were increased and/or the difference between the amplitude of the second current waveform 322 and the amplitudes of the third current waveform 323 and the fourth current waveform 324 were increased, the amplitude of the periodically varying torque profile 335 would be increased, and vice versa.

In the third example graph 303, the phase shifts of the first to fourth current waveforms are at non-uniform intervals. In particular, the phase shift of the first current waveform 321 with respect to the reference waveform 349 is approximately 170°, the phase shift of the second current waveform 322 with respect to the reference waveform 349 is approximately 135°, the phase shift of the third current waveform 323 with respect to the reference waveform 349 is approximately 90° and the phase shift of the fourth current waveform 324 with respect to the reference waveform 349 is approximately 45°. Therefore, the phase shift of the first current waveform 321 with respect to the reference waveform 349 in the third example graph 303 has been varied by approximately 10° compared to the phase shift of the first current waveform 321 with respect to the reference waveform 349 in the first example graph 301 and the second example graph 302. As a consequence, the torque profile 335 is caused to periodically vary and deviate from the mean torque line 339 during the electrical period. Like in the second example graph 302, the frequency composition of the varying torque profile 335 includes a first frequency component, $f_{t,1}$, which is approximately two times the fundamental frequency, $f_{c,1}^{ref}$, of the reference waveform 349.

However, the phase shift of the periodically varying torque profile 335 with respect to the reference waveform 349 shown in the third example graph 303 differs from the phase shift of the periodically varying torque profile 349 with respect to the reference waveform 349 shown in the second example graph 302. In the specific example of FIG. 7, variation of the phase shift of the first current waveforms 321 (the particular waveform that was phase-shifted relative to the example of FIG. 5) with respect to the other current waveforms 322-324 is associated with the phase shift of the periodically varying torque profile 335 relative to the reference waveform 349. In broader terms, the phase shift of the periodically varying torque profile 335 relative to the reference waveform 349 may be varied (e.g., controlled) by variation of a phase shift of one or more of the current waveforms 321-324 relative to at least one of the other current waveforms 321-324 (i.e., so that the phase shift varies between at least two of the current waveforms 321-324). Further, it should be noted that variation of the phase shift of the one or more of the current waveforms 321-324 relative at least one of the other current waveforms 321-324 may also result in a change in the amplitude of the periodically varying torque profile 335, and so the amplitude of the periodically varying torque profile may also be varied (e.g., controlled) by variation of the phase shift of the one or more of the current waveforms 321-324 relative to at least one of the other current waveforms 321-324.

Figure 8:
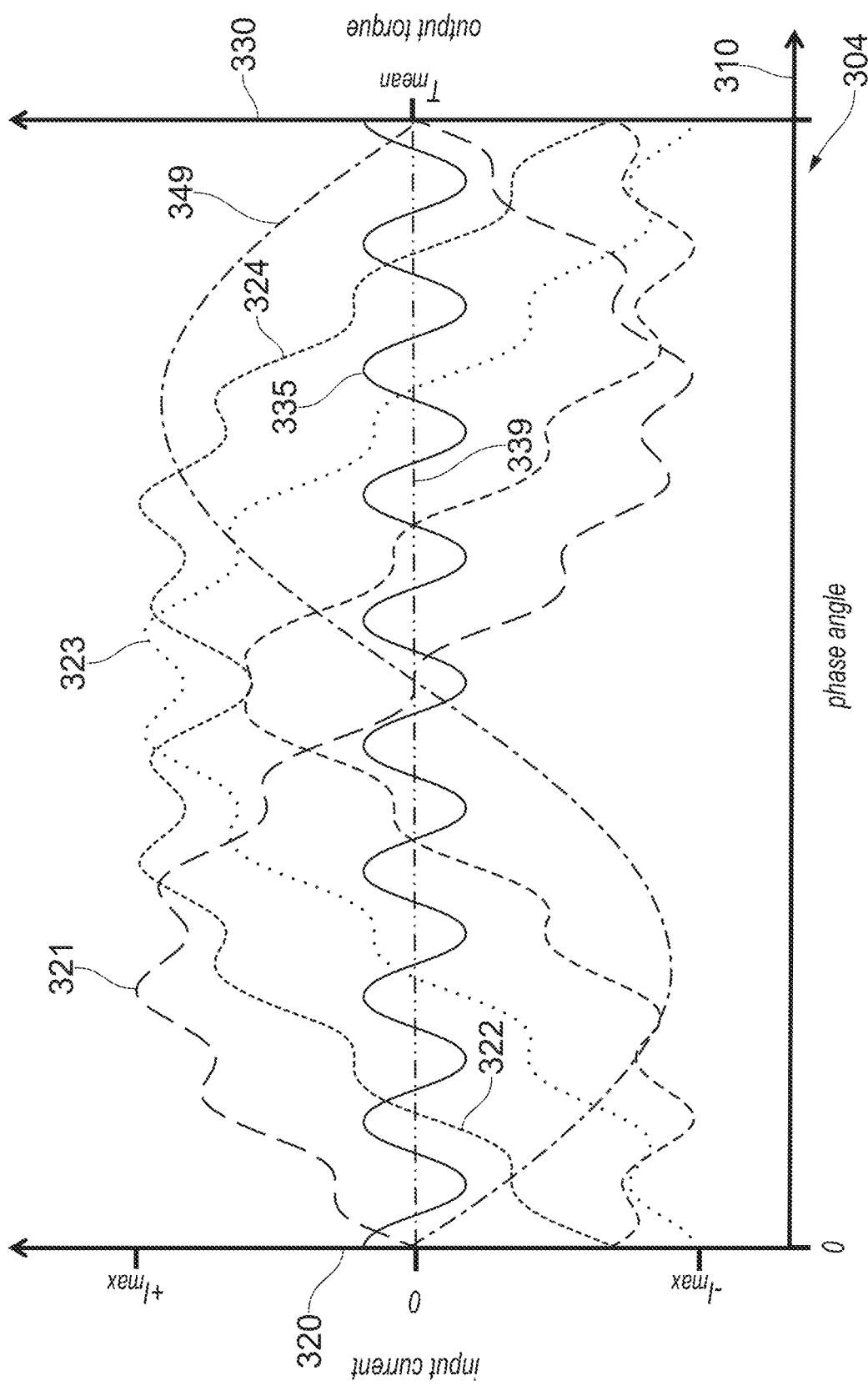
FIG. 8 is a fourth example annotated graph which shows a plurality of current waveforms and a temporally varying torque.

In the fourth example graph 304 of FIG. 8, each of the current waveforms 321-324 are not simple sinusoids and the frequency composition of each of the current waveforms 321-324 includes both a first frequency component, $f_{c,1}^{1:4}$, which is equal to the fundamental frequency of the reference waveform 349, $f_{c,1}^{ref}$, and a second frequency component, $f_{c,2}^{1:4}$, which is equal to ten times the fundamental frequency of the reference waveform 349, $f_{c,1}^{ref}$. The second frequency component, $f_{c,2}^{1:4}$, is superimposed on the first frequency component, $f_{c,1}^{1:4}$, of each of the current waveforms 321-324, and the second frequency component, $f_{c,2}^{1:4}$, has an amplitude (e.g., a power) which is 10% of the amplitude (e.g. the power) of the first frequency component, $f_{c,1}^{1:4}$. In this example, the torque profile 335 is caused to periodically vary at a frequency which is approximately nine times the fundamental frequency of the reference waveform 349, $f_{c,1}^{ref}$. In other words, the frequency composition of the torque profile 335 includes an added frequency component, $f_{t,a}$, which is equal to nine times the fundamental frequency of the reference waveform 349, $f_{c,1}^{ref}$. Otherwise, as in the first example graph 301 of FIG. 5, the phase difference between each of the first to third current waveforms is 45°, while the phase difference between the fourth current waveform 324 and the first current waveform 321 is approximately 135° (or 225°) and the amplitude of each of the current waveforms 321-324 is substantially equal to the amplitude of the other current waveforms 321-324.

Figure 9:
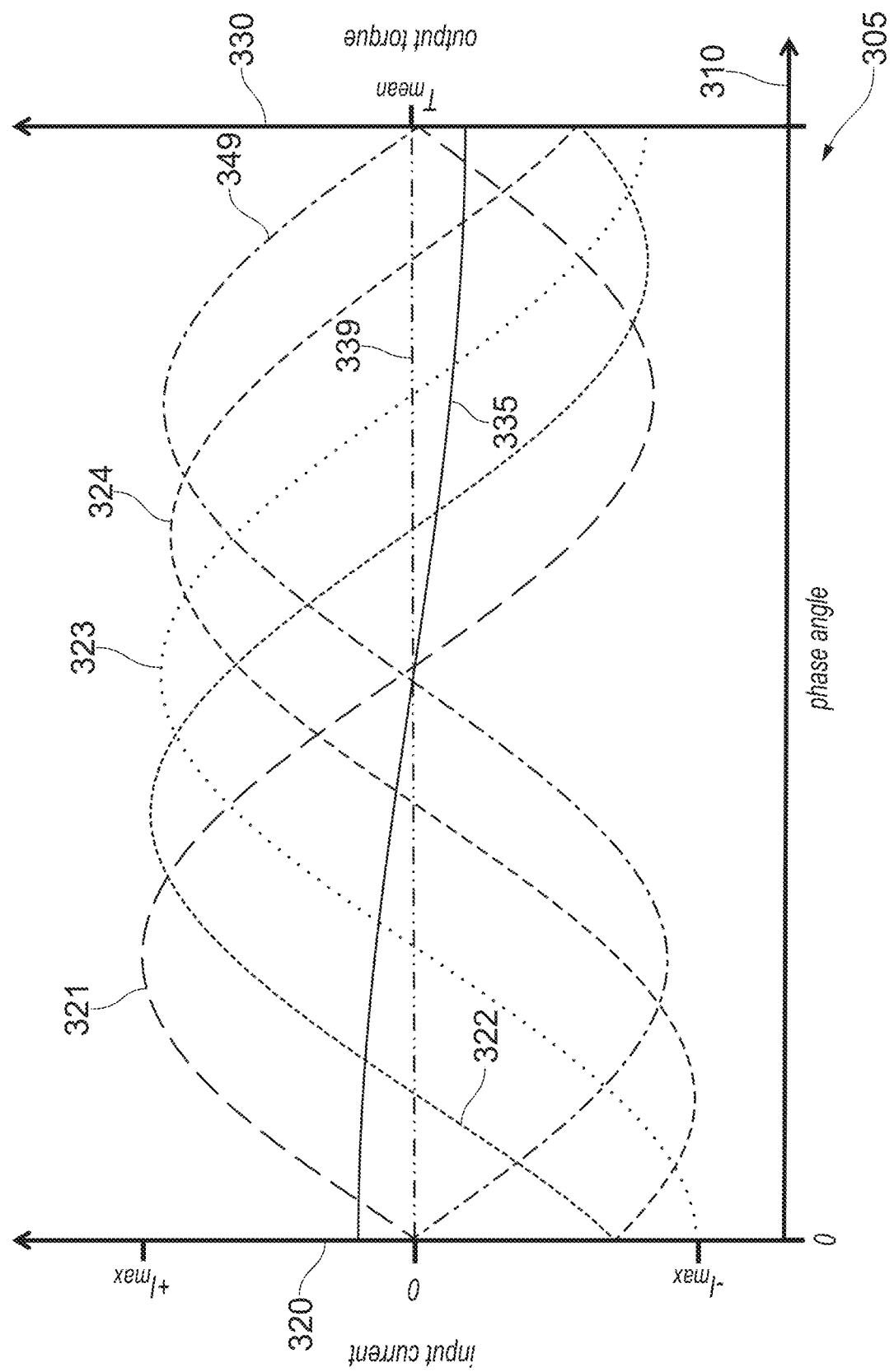
FIG. 9 is a fifth example annotated graph which shows a plurality of current waveforms and a temporally varying torque.

In the fifth example graph 305 of FIG. 9, the frequency composition of each of the current waveforms 321-324 includes both a first frequency component, $f_{c,1}^{1:4}$, which is equal to a fundamental frequency of the reference waveform 349, $f_{c,1}^{ref}$, and a second frequency component, $f_{c,2}^{1:4}$, which is equal to half the fundamental frequency of the reference waveform 349. The second frequency component, $f_{c,2}^{1:4}$, is superimposed on the first frequency component, $f_{c,1}^{1:4}$, of each of the current waveforms 321-324, and the second frequency component, $f_{c,2}^{1:4}$, has an amplitude (e.g., a power) which is 10% of the amplitude (e.g. the power) of the first frequency component, $f_{c,1}^{1:4}$. Therefore, the torque profile 335 is caused to periodically vary at a frequency which is approximately half the fundamental frequency of the reference waveform 349, $f_{c,1}^{ref}$. That is to say that the frequency composition of the torque profile 335 includes an added frequency component, $f_{t,a}$, which is equal to half the fundamental frequency of the reference waveform 349, $f_{c,1}^{ref}$. Otherwise, as in the first example graph 301 of FIG. 5, the phase difference between each of the first to third current waveforms is 45°, while the phase difference between the fourth current waveform 324 and the first current waveform 321 is approximately 135° (or 225°).

Figure 10:
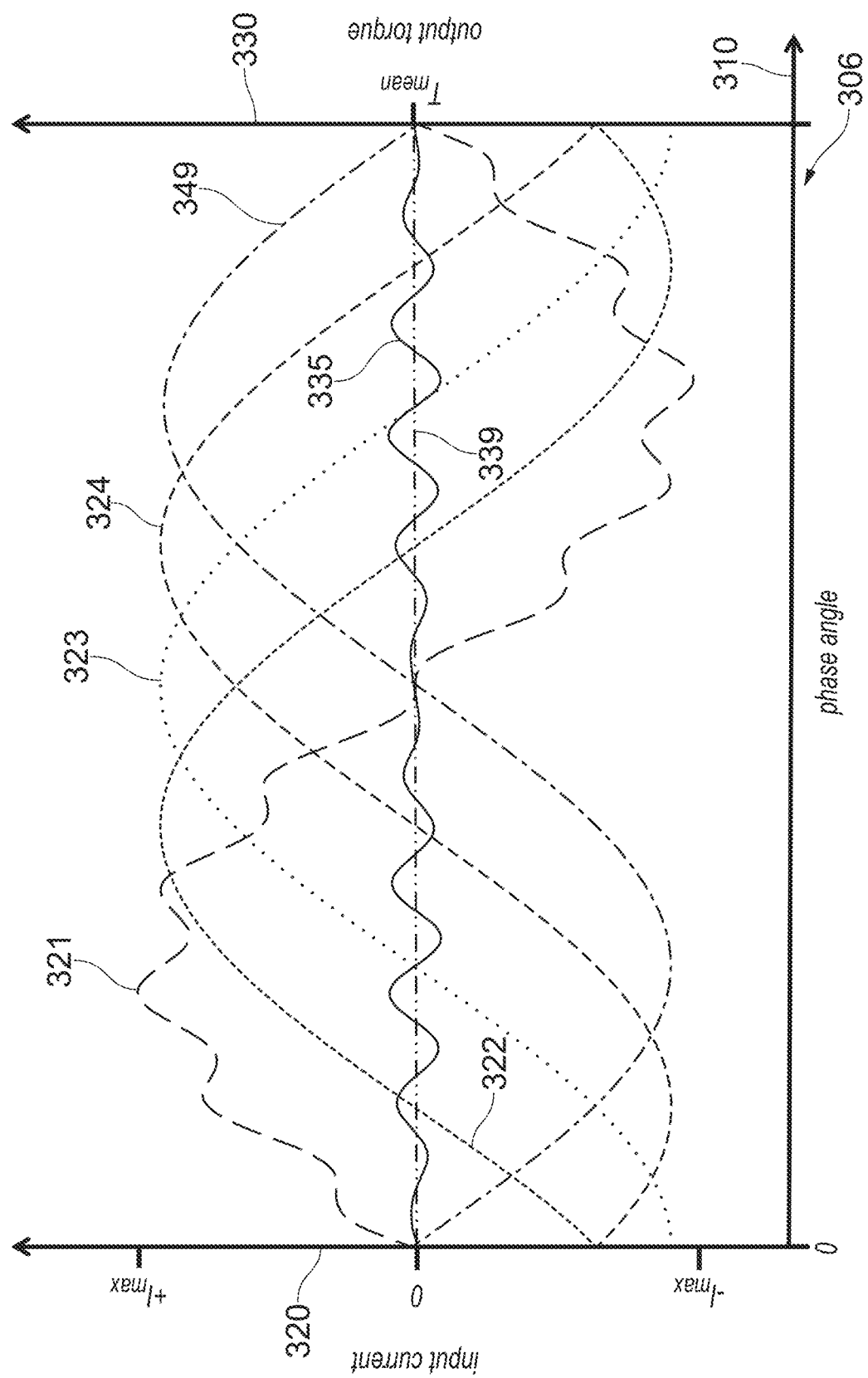
FIG. 10 is a sixth example annotated graph which shows a plurality of current waveforms and a temporally varying torque.

In the sixth example graph 306 of FIG. 10, the first current waveform 321 is not a simple sinusoid and the frequency composition of the first current waveform 321 includes both a first frequency component, $f_{c,1}^{1}$, which is equal to a fundamental frequency of the reference waveform 349, $f_{c,1}^{ref}$, and a second frequency component, $f_{c,2}^{1}$, which is equal to ten times the fundamental frequency of the reference waveform 349, $f_{c,1}^{ref}$. The second frequency component, $f_{c,2}^{1}$, is superimposed on the first frequency component, $f_{c,1}^{1}$, of the first current waveform 321, and the second frequency component, $f_{c,2}^{1}$, has an amplitude (e.g., a power) which is 10% of the amplitude (e.g. the power) of the first frequency component, $f_{c,1}^{1}$. In contrast, each of the second current waveform 322, the third current waveform 323 and the fourth current waveform 324 are simple sinusoids and the frequency composition of each of the second current waveform 322, the third current waveform 323 and the fourth current waveform 324 includes only a single frequency component, $f_{c,1}^{2:4}$, which is equal to a fundamental frequency of the reference waveform 349, $f_{c,1}^{ref}$. Consequently, the torque profile 335 is caused to vary with respect to time in a complex manner, as shown in FIG. 10. The torque profile 335 is a complex waveform having a frequency composition comprising a plurality of frequency components, $f_{t,1:n}$. The complex waveform of the torque profile 335 repeats periodically at a frequency, $f_{t,p}$, of approximately two times the frequency of the reference waveform 349, $f_{c,1}^{ref}$. Otherwise, as in the first example graph 301 of FIG. 5, the phase difference between each of the first to third current waveforms is 45°, while the phase difference between the fourth current waveform 324 and the first current waveform 321 is approximately 135° (or 225°).

In the fourth example graph 304 of FIG. 8, a ratio of the second frequency component, $f_{c,2}^{1:4}$, of each current waveform 321-324 to the fundamental frequency of the reference waveform 349, $f_{c,1}^{ref}$, was approximately equal to 10, while a ratio of the added frequency component, $f_{t,a}$, of the torque profile 335 to the fundamental frequency of the reference waveform 349, $f_{c,1}^{ref}$, was approximately equal to 9. In contrast, in the fifth example graph 305, the ratio of the second frequency component, $f_{c,2}^{1:4}$, of each current waveform 321-324 to the fundamental frequency of the reference waveform 349, $f_{c,1}^{ref}$, was approximately equal to 0.5, while the ratio of the added frequency component, $f_{t,a}$, of the torque profile 335 to the fundamental frequency of the reference waveform 349, $f_{c,1}^{ref}$, was approximately equal to 0.5.

The first column of the table below lists various values for a ratio of an added current frequency component, $f_{c,a}^{1:4}$, which is added to the frequency composition of each current waveform 321-324 to the fundamental frequency of the reference waveform 349, $f_{c,1}^{ref}$ (that is, the ratio given by $f_{c,a}^{1:4}/f_{c,1}^{ref}$). The second column of the table below lists corresponding values for a ratio of an added torque frequency component, $f_{t,a}$, to the fundamental frequency, $f_{c,1}^{ref}$, of the reference waveform 349 (that is, the ratio given by $f_{t,a}/f_{c,1}^{ref}$) with the added torque frequency component, $f_{t,a}$, being included in the frequency composition of the torque applied to the rotor 234 as a result of the added current frequency component, $f_{c,a}^{1:4}$, being included within the frequency composition of each current waveform 321-324.

| $f_{c,a}^{1:4}/f_{c,1}^{ref}$ | $f_{t,a}/f_{c,1}^{ref}$ |
|---|---|
| 0 | 1 |
| 0.01 | 1 |
| 0.05 | 1 |
| 0.1 | 1 |
| 0.2 | 0.8 |
| 0.5 | 0.5 |
| 0.8 | 0.2 |
| 2 | 1 |
| 5 | 4 |
| 10 | 9 |

On the basis the table above, it can be inferred that when the torque frequency component, $f_{t,a}$, which is to be added to the torque frequency composition is less than unity (i.e., $f_{t,a}<1$) and greater than approximately 0.1, the current frequency component, $f_{c,a}^{1:4}$, which may be added to the frequency composition of each current waveform 321-324 to cause the torque frequency component to be added to the torque frequency composition is given by $f_{c,a}^{1:4}=(1-f_{t,a})$. On the other hand, when the torque frequency component, $f_{t,a}$, which is to be added to the torque frequency composition is greater than unity (i.e., $f_{t,a}>1$), a current frequency component, $f_{c,a}^{1:4}$, which may be added to the frequency composition of each current waveform 321-324 to cause the torque frequency component to be added to the torque frequency composition is given by $f_{c,a}^{1:4}=(f_{t,a}+1)$.

In more general terms, the frequency composition of the periodically varying torque profile 335 may be controlled by controlling the frequency composition of one or more of the current waveforms 321-324. More specifically, the frequency composition of the periodically varying torque profile 335 may be varied by varying the frequency composition of one or more of the current waveforms 321-324 so that the frequency composition of the one or more of the current waveforms 321-324 includes one or more frequency components which are not equal to (e.g., substantially greater than or less than) the fundamental frequency, $f_{c,1}^{ref}$, of the reference waveform 349. Moreover, it should be noted that variation of the frequency composition of one or more of the current waveforms 321-324 so as to include one or more frequency components which are not equal to (e.g., substantially greater than or less than) the fundamental frequency, $f_{c,1}^{ref}$, of the reference waveform 349 may also result in a change in the amplitude of the periodically varying torque profile 335, and so the amplitude of the periodically varying torque profile may also be varied (e.g., controlled) by variation of the frequency composition of the one or more of the current waveforms 321-324 in this way.

The description returns now to the example method 400 shown by FIG. 4, and in particular, the action of determining and/or accessing (at block 430) the one or more target torque characteristics. The determined target torque characteristics (at block 430) may include a target mean torque, a target frequency composition, a target phase shift and a target amplitude of the periodically varying torque applied to the rotor 234. A target frequency composition, a target phase shift and a target amplitude of the periodically varying torque applied to the rotor 234 may be referred to as a group of target torque ripple characteristics.

The target mean torque may be determined based on a mean torque demand determined or received by the controller 290 (at block 432) and/or a mean speed demand determined or received by the controller 290 (at block 434). In turn, the mean torque demand may be determined (at block 432) based on a mean speed demand signal received from an external system (e.g., the EEC 117) and the angular speed of the rotor 234 (as monitored at block 420). More specifically, the controller 290 may determine the mean torque demand based on a difference between the mean speed demand signal and the angular speed of the rotor 234, which may be referred to as a mean speed error. The controller 290 may process the mean speed error using any suitable control logics (e.g., P, PI, PD or PID control logics and the like) in order to determine the mean torque demand. Otherwise, the mean torque demand may be determined (at block 432) based on a mean torque demand signal received from an external system (e.g., the EEC 117). In a similar way, the mean speed demand may be determined (at block 434) based on a mean speed demand signal received from an external system (e.g., the EEC 117).

By way of introduction to the specific examples which follow, torque characteristic(s) may correspond to stored parameters for causing or offsetting a periodic behaviour of the load 230. The torque characteristic(s) may be predetermined based on a component classification of the load 230 or may be predetermined based on specific pre-installation testing of the load 230 (which may be referred to as per-unit passive control). Additionally, or alternatively, the torque characteristic(s) may be determined and/or updated based on information received from an external system (which may be referred to as fleet-wide passive control). Otherwise, torque characteristic(s) may be determined and/or updated based on live monitoring of appropriate quantities to cause or offset a periodic behaviour of the load 230 (which may be referred to as per-unit active control).

At least one or each target torque characteristic may be accessed (at block 430) from the memory provided to the controller 290. At least one or each target torque characteristic may be a predetermined target torque characteristic which is permanently stored on the memory provided to the controller 290 and which is not altered or updated during operation of the electric drive apparatus 201, 202 (i.e., the or each predetermined target torque characteristic is not overwritten during use). At least one or each predetermined target torque characteristic may be permanently stored on a read-only memory provided to the controller 290 during a manufacturing, commissioning or servicing process of the electric drive apparatus 201, 202.

Otherwise, the controller 290 may be configured to update the or each target torque characteristic stored on the memory provided to the controller 290 so as to vary operation of the electric drive apparatus 201, 201, for example following a manufacturing, commissioning or servicing process of the electric drive apparatus 201, 202 and/or a system in which the apparatus 201, 202 is incorporated (e.g., a gas turbine engine). For instance, the controller 290 may be configured to receive one or more updated target torque characteristics from an external system (e.g., an external data processing system such as a server or the EEC 117) via a wired or wireless connection (e.g., via a radio connection, a Bluetooth® connection or an internet connection). The controller 290 may then update (i.e., overwrite) the or each target torque characteristic in accordance with the one or more received updated target torque characteristics. As a consequence of the target torque characteristic(s) being updated in this way, the group of torque characteristics of the torque applied to the rotor 234 may be varied compared to the group of torque characteristics applied to the rotor 234 before the target torque characteristic(s) were updated.

It may be that one or more of the target frequency composition, the target phase shift and the target amplitude of the torque applied to the rotor 234 is/are defined according to the angular speed of the rotor 234. To this end, it may be that the controller is configured to access a lookup table stored in the memory provided to the controller 290, the lookup table relating the angular speed of the rotor 234 to the target frequency composition, the target phase shift and/or the target amplitude of the torque to be applied to the rotor 234. Alternatively, it may be that the controller is configured to evaluate one or more algebraic equation(s) which relate(s) the angular speed of the rotor 234 to the target frequency composition, the target phase shift or the target amplitude of the torque to be applied to the rotor 234.

The target frequency composition, the target phase shift and/or the target amplitude of the torque applied to the rotor 234 may be defined according to the angular speed of the rotor 234 to minimise an effect of flow ripple in the flow of fluid on a wider system in which the electric drive apparatus 202 is incorporated. For instance, the target frequency composition, the target phase shift and/or the target amplitude of the torque applied to the rotor 234 may be defined according to the angular speed of the rotor 234 (or a related parameter) to minimise an effect of any flow ripple in the flow of fluid on mechanical resonance(s) of the fuel passageway 250 (e.g., the second portion of the fuel passageway 250) and/or the fuel valves 256, 258. By way of example, it may be that when the angular speed of the rotor 234 lies within a predetermined range (e.g., a keep-out range) of a resonant frequency of the fuel passageway 250 (e.g., the second portion 254 of the fuel passageway 250) or within a predetermined range (e.g., a keep-out range) of a resonant frequency of at least one or each fuel valve 256, 258, the target phase shift and/or the target amplitude of the torque applied to the rotor 234 may be defined so as to reduce an expected effect of flow ripple on the mechanical resonance(s) of the fuel passageway 250 or the fuel valves 256, 258.

Additionally, or alternatively, at least one or each target torque ripple characteristic may be determined or updated (at block 420) based on a ripple torque demand (i.e., a torque ripple demand) determined or received by the controller 290 (at block 436) and/or a ripple speed demand (i.e., a speed ripple demand) determined or received by the controller 290 (at block 438). The ripple torque demand relates to a demand to provide a periodically varying torque to the rotor 234 having a defined (e.g., prescribed) group of torque characteristics. The ripple speed demand relates to a demand to drive the rotor 234 at a periodically varying speed, with a profile of the periodically varying speed (e.g. a speed waveform) being defined by a group of speed characteristics which include a frequency composition, a phase shift and an amplitude. As will be appreciated by those skilled in the art, the rotor 234 may be driven at a periodically varying speed by providing a periodically varying torque to the rotor 234. Accordingly, the ripple speed demand indirectly relates to a demand to provide a periodically varying torque to the rotor 234 having a defined (e.g., prescribed) group of torque characteristics.

The ripple torque demand and/or the ripple speed demand may be determined (at blocks 436 and 438, respectively) based on the parameter associated with the load 240 (as monitored at block 410). If the ripple torque demand and/or the ripple speed demand is determined (at blocks 436 and 438, respectively) based on the parameter associated with the load 240 (as monitored at block 410), the at least one or each target torque characteristic may be updated based on the monitored parameter so as to cause or vary a temporal (e.g., periodic) variation in the monitored parameter (or the monitored plurality of parameters, if applicable), with the periodic variation in the torque applied to the rotor 234 and/or the periodic variation in the speed of the rotor 234 resulting in the periodic variation in the monitored parameter(s). In addition, or instead, the ripple torque demand and/or the ripple speed demand may be determined (at blocks 436 and 438, respectively) based on the angular speed of the rotor 234 (as monitored at block 420).

As an example, in the context of the first example electric drive apparatus drive apparatus, the ripple torque demand and/or the ripple speed demand may be determined based on a mechanical property of the turbomachine disc and the angular speed of the rotor 234. For instance, it may be that when the turbomachine disc is driven at an angular speed corresponding to a frequency which lies within a predetermined range of a resonant frequency of the turbomachine disc, the ripple torque demand and/or the ripple speed demand may relate to a demand to modify the resonant behaviour of the turbomachine disc within the predetermined range of the resonant frequency of the turbomachine disc by applying a periodically varying torque to the rotor 234 and/or a drive the rotor 234 at a periodically varying speed for the purpose of active vibration isolation/cancellation in the turbomachine disc.

In a variant of the first example electric drive apparatus, the load may be an alternative mechanical load, such as an actuator (e.g., a motor and/or transmission) for a variable stator vane arrangement. The actuator as installed or designed may have a non-uniform profile of torque to displacement, which may reflect machining and/or and installation tolerances in the actuator, for instance. In this example, the ripple torque demand and/or the ripple speed demand may be determined based on a monitored mechanical property of the actuator, for example a monitored torque and/or a monitored displacement. The ripple torque demand and/or ripple speed demand may relate to a demand to modify the operation of the actuator (e.g., a supplied power or torque input) to modify the rate of displacement of the actuator to achieve a more uniform (smoother) displacement profile with respect to time in use. A periodically varying torque may be applied to the actuator to counteract an underlying ripple profile in the actuator.

As another example, in the context of the second example electric drive apparatus 202, the ripple torque demand and/or the ripple speed demand may be determined based on a target ripple waveform to be generated within the fluid flow along the fluid passageway 250, with the target ripple waveform being defined by a group of target flow ripple characteristics including a target flow ripple frequency composition, a target flow ripple amplitude and/or a target flow phase shift. The monitored parameter associated with the load 240 may be processed by the controller 290 so as to determine a group of monitored flow ripple characteristics which define a monitored flow ripple waveform present within the fluid flow along the fluid passageway 250. The group of target flow ripple characteristics may include a monitored flow ripple frequency composition, a monitored flow ripple amplitude and/or a monitored flow phase shift. The ripple torque demand and/or the ripple speed demand may then be determined by the controller 290 in order to maintain the or each monitored flow ripple characteristic at or within the corresponding target flow ripple characteristic (which may be a target range). In this way, at least one or each target torque characteristic may be updated based on the monitored parameter associated with the load 240 to control a ripple waveform in the fluid flow along the fluid passageway 250. In particular, at least one or each target torque characteristic may be updated based on the monitored parameter associated with the load 240 to maintain the target flow ripple frequency amplitude, the target flow ripple frequency composition and/or the target flow phase shift of the ripple waveform in the fluid flow along the fluid passageway 250.

When the method 400 is executed with respect to an electric drive apparatus in accordance with the second example electric drive apparatus 202, the ripple torque demand and/or the ripple speed demand may be determined (at blocks 436 and 438, respectively) based on a control regime for at least one or each fuel valve 256, 258. For example, it may be desirable to add an appropriate target ripple waveform into the flow of fuel within the fuel passageway 250 downstream of the pump 241 which results in a mechanical excitation of at least one or each fuel valve 256, 258. The mechanical excitation of the at least one or each fuel valve 256, 258 may be used to aid actuation of the or each fuel valve 256, 258 between an open state and a closed state per the control regime and/or to cause relatively small-amplitude translation of the respective valve so as to reduce a likelihood of sticking (for example if the valve face were to become thermally fused to the corresponding valve seat due to, for instance, high levels of heating from the combustor 106). For these purposes, it may be that the target flow ripple frequency composition, the target flow ripple amplitude and/or the target flow phase shift may be maintained within respective target range(s) defined relative to the control regime for the at least one or each fuel valve 256, 258.

Further, the ripple torque demand and/or the ripple speed demand may be determined (at blocks 436 and 438, respectively) based on a combustor rumble parameter relating to a combustor rumble effect within the combustor 106. The combustor rumble effect is associated with pressure and/or gas velocity fluctuations in the combustor 106, which in turn lead to thermo-acoustic oscillations known as combustor rumble. A significant combustor rumble effect is linked with an increase likelihood of fatigue failure of components in an engine and/or relatively high levels of flame instability within the combustor 106, which may lead to flame-out of the engine. To this end, the controller 290 may be configured to determine the combustor rumble parameter based on a signal received from the load-associated sensing arrangement 284 or from a dedicated combustor rumble sensing arrangement (not shown). Otherwise, the load-associated sensing arrangement 284 or the dedicated combustor rumble sensing arrangement may provide the combustor rumble parameter directly to the controller 290. An example implementation of a suitable dedicated combustor rumble sensing arrangement is described in US 2010/0158670 A1. The ripple torque demand and/or the ripple speed demand may be so determined (at blocks 436 and 438, respectively) so as to maintain the combustor rumble parameter within a target combustor rumble range. That is, the at least one or each target torque characteristic may be updated so as to mitigate the combustor rumble effect in the combustor 106 by adding an appropriate target ripple waveform in the flow of fuel within the fluid passageway 250 which results in reduced pressure and/or gas velocity fluctuations in the combustor 106 (e.g., by introducing pressure and/or velocity fluctuations in the flow of fuel in the fuel passageway 250 which result in reduction of pressure and/or velocity fluctuations in the combustor 106 by destructive interference/cancellation).

Electric drive apparatuses in accordance with the present disclosure enable a torque applied to a load via the rotor of the electric drive apparatus to be precisely controlled so as to cause a periodically varying torque to be applied to the load via the rotor. In particular, one or more of a group of characteristics of the periodically varying torque applied to the load via the rotor of the electric drive apparatus may be individually and/or collectively controlled. In turn, this may facilitate various control objectives associated with the load to be met and/or managed across a range of operational conditions of the load.

Various examples have been described, each of which include various combinations of features. It will be appreciated by those skilled in the art that, except where clearly mutually exclusive, any of the features may be employed separately or in combination with any other features and the disclosure extends to and includes all combinations and sub-combinations of one or more features described herein.

It will also be appreciated that whilst the disclosure has been described with reference to aircraft and aircraft propulsion systems, the electric machine drive techniques described herein could be used for many other applications. These include, but are not limited to, automotive, marine and land-based applications.

We claim:
1. An electric drive apparatus comprising an inverter system, an electric motor and a controller, wherein
the electric motor includes a rotor and a plurality of phase windings;

the inverter system is configured to provide a respective current waveform to each of the phase windings of the electric motor;

each of the respective current waveforms is defined by a group of electrical characteristics including:
a frequency composition,
a phase shift relative to a reference waveform, the reference waveform relating to an angular position of the rotor and/or an angular position of a magnetic field induced in the phase windings when each of the respective current waveforms is provided to the respective phase winding, and
an amplitude; and for one or more of the current waveforms, the controller is configured to control one or more of the group of electrical characteristics to cause a periodically varying torque to be applied to the rotor, wherein the controller is configured so that for each of the one or more of the group of electrical characteristics which is controlled to cause the periodically varying torque, the controller causes the respective electrical characteristic to vary between at least two of the current waveforms.

2. The electric drive apparatus of claim 1, wherein
the periodically varying torque is defined by torque characteristics including:
a frequency composition,
a phase shift relative to the reference waveform, and
an amplitude; and
the controller is configured to control one or more of the group of electrical characteristics of the or each of the one or more of the current waveforms to control one or more of the torque characteristics.

3. The electric drive apparatus of claim 2, wherein the controller is configured to:
control the phase shift of the periodically varying torque by controlling the phase shift of the one or more of the current waveforms so that the phase shift of the one or more of the current waveforms varies between at least two of the current waveforms.

4. The electric drive apparatus of claim 2, wherein the controller is configured to:
control the amplitude of the periodically varying torque by:
controlling the phase shift of the one or more of the current waveforms so that the phase shift of the one or more of the current waveforms varies between at least two of the current waveforms; and/or
controlling the amplitude of the one or more of the current waveforms so that the amplitude of the one or more of the current waveforms varies between at least two of the current waveforms.

5. The electric drive apparatus of claim 2, wherein the controller is configured to:
control the frequency composition of the periodically varying torque by controlling the frequency composition of the one or more of the current waveforms so that the frequency composition of the one or more of the current waveforms includes one or more frequency components which are not equal to a fundamental frequency of the reference waveform.

6. The electric drive apparatus of claim 2, wherein
the controller is configured to control the or each of the one or more torque characteristics to be maintained at a respective target value.

7. The electric drive apparatus of claim 6, wherein the respective target value is defined according to an angular speed of the rotor.

8. The electric drive apparatus of claim 6, wherein for each of the one or more torque characteristics to be maintained at the respective target value, the respective target value is stored on a memory provided to the controller; and the controller is configured to update the respective target value to vary operation of the electric drive apparatus.

9. The electric drive apparatus of claim 8, wherein
the controller is configured to receive an updated target value for one or more of the torque characteristics from an external system.

10. The electric drive apparatus of claim 8, comprising a sensing arrangement, and wherein
the rotor is configured to drive a load;
the sensing arrangement is configured to monitor a parameter associated with the load; and
the controller is configured to update the or each respective target value based on the monitored parameter to cause or vary a periodic variation of the monitored parameter.

11. The electric drive apparatus of claim 10, wherein
the monitored parameter is selected from a group consisting of: a displacement, a velocity, an acceleration, a strain and a stress associated with the load;
the monitored parameter relates to a vibration of the load;
the monitored parameter is selected from a group consisting of: a pressure, a flow rate, a density, a velocity and a viscosity of a fluid flow driven by the load; or
the monitored parameter is an acoustic parameter relating to the fluid flow driven by the load.

12. The electric drive apparatus of claim 10, wherein
the load is a pump for driving a fluid flow;
the monitored parameter is selected from a group consisting of: a pressure, a flow-rate, a density, a velocity and a viscosity of the fluid, or an acoustic parameter relating to the fluid flow driven by the pump.

13. The electric drive apparatus of claim 12, wherein the pump is a fuel pump for pumping fuel to a combustor.

14. The electric drive apparatus of claim 12, wherein the controller is configured to update the respective target value based on the monitored parameter so as to control a ripple waveform in the fluid flow.

15. The electric drive apparatus of claim 14, wherein
the controller is configured to update the respective target value based on the monitored parameter so as to control the ripple waveform in the fluid flow to maintain a target flow ripple amplitude, a target flow ripple frequency composition and/or a target flow phase shift of the ripple waveform.

16. A fuel supply apparatus comprising the electric drive apparatus of claim 12 and a fluid passageway, wherein
the fluid is a fuel;
the fluid passageway is configured to convey the fuel from the pump to a combustor;
the controller is configured to update the respective target value based on the monitored parameter so as to control a ripple waveform in the fluid flow to maintain:
a combustor rumble parameter within a target rumble range; and/or
a target flow ripple amplitude, a target flow ripple frequency composition and/or a target flow phase shift of the ripple waveform relative to a control regime for a fuel valve within a respective target range for operation of the fuel valve, wherein the fuel valve is configured to control fuel flow from the fluid passageway to the combustor.

17. The electric drive apparatus of claim 1, wherein the reference waveform relates to an estimated angular position of the rotor relative to one of the phase windings, the estimated angular position being estimated based on a uniform rotational speed of the rotor;

the reference waveform relates to a monitored angular position of the rotor relative to the one of the phase windings; or the reference waveform relates to a back-electromotive force signal at the one of the phase windings, corresponding to rotation of the rotor.

18. A gas turbine engine comprising the electric drive apparatus of claim 1.

* * * * *